United States Patent
Jang et al.

(10) Patent No.: US 7,953,466 B2
(45) Date of Patent: May 31, 2011

(54) SUPERCONDUCTING CABLE

(75) Inventors: Hyun-man Jang, Gyeonggi-do (KR); Chang-young Lee, Gyeonggi-do (KR); Choon-dong Kim, Gyeonggi-do (KR)

(73) Assignee: LS Cable Ltd, Seoul (KR)

( * ) Notice: Subject to any disclaimer, the term of this patent is extended or adjusted under 35 U.S.C. 154(b) by 507 days.

(21) Appl. No.: 12/161,428

(22) PCT Filed: Oct. 16, 2006

(86) PCT No.: PCT/KR2006/004168
§ 371 (c)(1),
(2), (4) Date: Jul. 18, 2008

(87) PCT Pub. No.: WO2007/083873
PCT Pub. Date: Jul. 26, 2007

(65) Prior Publication Data
US 2008/0312089 A1    Dec. 18, 2008

(30) Foreign Application Priority Data

Jan. 20, 2006   (KR) .................. 10-2006-0006067

(51) Int. Cl.
H01B 12/00    (2006.01)
H01B 12/02    (2006.01)
(52) U.S. Cl. ........ 505/231; 505/230; 505/232; 505/704; 505/705; 174/125.1; 174/15.4; 174/15.5; 29/599

(58) Field of Classification Search .......... 505/230–232, 505/430, 431, 704; 174/125.1, 15.5, 15.4; 29/599
See application file for complete search history.

(56) References Cited

U.S. PATENT DOCUMENTS

| | | | |
|---|---|---|---|
| 2004/0058822 A1* | 3/2004 | Ohmatsu ...................... | 505/100 |
| 2004/0216915 A1* | 11/2004 | Hirose ........................ | 174/125.1 |
| 2004/0256144 A1* | 12/2004 | Masuda et al. ............. | 174/125.1 |
| 2006/0175078 A1* | 8/2006 | Yumura et al. ............. | 174/125.1 |

FOREIGN PATENT DOCUMENTS

| | | | |
|---|---|---|---|
| JP | 2005-100777 | | 4/2005 |
| WO | WO 03/085682 A1 | | 10/2003 |
| WO | WO2005/029509 | * | 3/2005 |

* cited by examiner

*Primary Examiner* — Stanley Silverman
*Assistant Examiner* — Kallambella Vijayakumar
(74) *Attorney, Agent, or Firm* — Lowe Hauptman Ham & Berner LLP

(57) ABSTRACT

A superconductive cable is provided which upon normal state, restricts flowing of electric current to a former to the maximum extent to thereby keep a cryogenic state in the superconductive cable stable. The superconductive cable includes a former surrounded by a superconductive layer and a cryostat provided at the outside of the superconductive layer, wherein the former includes a metal wire-wound part around which a plurality of wires is wound and an eddy-current prevention layer provided on the outer face of the wire-wound part, and the metal wires and the eddy-current prevention layer are made of a copper alloy.

4 Claims, 1 Drawing Sheet

SUPERCONDUCTING CABLE

RELATED APPLICATIONS

This application is the U.S. National Phase under 35 U.S.C. §371 of International Application No. PCT/KR2006/004168, filed on Oct. 16, 2006, which in turn claims the benefit of Korean Patent Application No. 10-2006-0006067, filed on Jan. 20, 2006, the disclosures of which Applications are incorporated by reference herein.

TECHNICAL FIELD

The present invention relates to a superconductive cable, and more particularly to a superconductive cable which upon normal state, restricts flowing of electric current to a former to the maximum extent to thereby keep a cryogenic state in the superconductive cable stable.

BACKGROUND ART

A superconductor is a matter having a characteristic that under a certain condition, electric resistance completely disappears and a characteristic of perfect diamagnetism repelling a magnetic field. Such superconductor has been applied to many fields, such as medical service, transport, electronics, electric power, high-energy physics, machine, etc. In particular, a superconductive cable, to which a superconductor is adapted, has excellent transmission efficiency and capacity 5~10 times those of existing power cable so that it is substituting the existing power cable.

A currently available superconductive cable is generally composed of a combination of a core having a superconductor and a cryostat keeping the core in a cryogenic state. An electric current flows through the superconductor of the core. To secure excellent properties in such superconductive cable, an alternating current loss, such as eddy current loss, should be minimized and the cryogenic state in the superconductive cable should be kept stable.

Japanese Patent Unexamined Publication No. 2005-100777 has proposed a superconductive cable in which a plurality of superconductive wire rods is arranged on an outer circumferential face of a former constituting a core, whereby upon an accident such as a short-circuit, a superconductive layer is prohibited from increasing in temperature, and upon normal current passage, an alternating current loss is reduced. However, in the superconductive cable disclosed in the document, a magnetic field generated by the current flowing through the superconductive layer is applied to the former so that an eddy current is generated in the former, causing AC loss due to the eddy current.

Meanwhile, a superconductive cable is designed such that a transmission current flows through only the superconductive layer because of high resistance of the former at a normal state. In case of low resistance of the former, impedance of the superconductive layer should be kept smaller than the former, so that in order to lower the impedance of the superconductive layer, a strand pitch of the superconductive wire rod should be increased. However, if the strand pitch of the superconductive wire rod is increased, a bending characteristic of the superconductive cable is problematically degraded.

DISCLOSURE

Technical Problem

Accordingly, the present invention has been made to solve the above-mentioned problems occurring in the prior art, and an object of the present invention is to provide a superconductive cable which upon normal state, restricts flowing of electric current to a former to the maximum extent to thereby keep a cryogenic state in the superconductive cable stable.

Technical Solution

In order to accomplish the above object, there is provided a superconductive cable including a former having a superconductive layer and a cryostat provided at the outside of the former, the former including a metal wire-wound port around which a plurality of wires is wound and an eddy-current prevention layer provided on the outer face of the wire-wound part, and the metal wires and the eddy-current prevention layer are made of a copper alloy.

Herein, the copper alloy may be a Cu—Zn alloy.

In an embodiment, a metal tube may be provided along the center of the wire-wound part, and in which tube a cooling passage may be defined through which a cooling medium flows.

The cooling passage may have a diameter ranging from 10 to 30 mm.

According to the characteristics of the present invention, the superconductive cable is constructed such that the former is basically made of high electric resistance material, and the eddy-current prevention layer and the cooling passage are provided, thereby restricting the generation of eddy-current in the former and minimizing an AC loss of the superconductive cable.

DESCRIPTION OF DRAWINGS

The above and other objects, features and advantages of the present invention will be more apparent from the following detailed description taken in conjunction with the accompanying drawings, in which.

MODE FOR INVENTION

Hereinafter, a superconductive cable according to the preferred embodiments of the present invention will be described with reference to the accompanying drawings.

Figure 1:
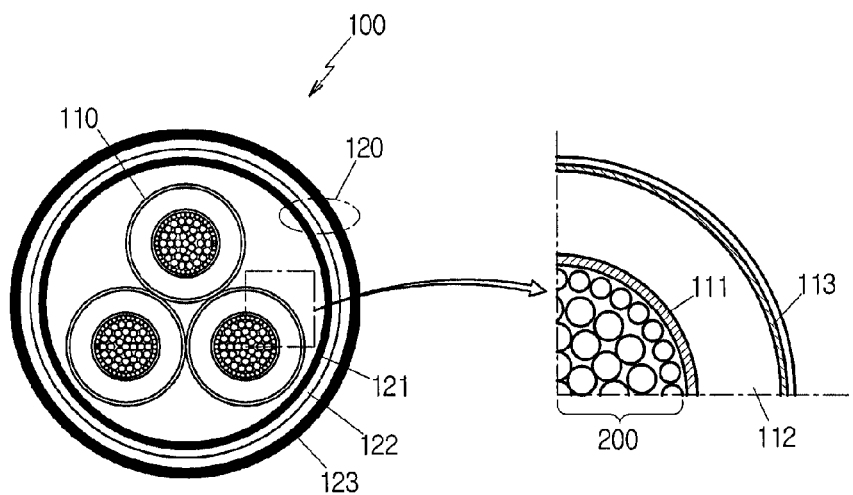
FIG. 1 is a sectional view of the construction of a superconductive cable according to the present invention.
Figure 2:
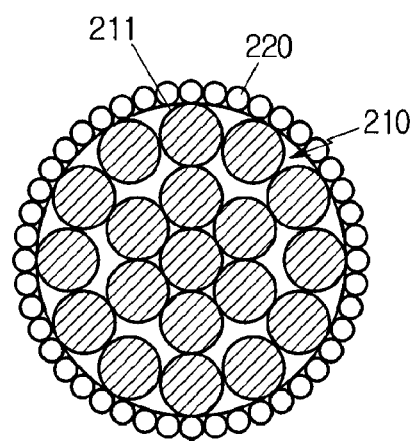
FIG. 2 is a sectional view of the construction of a former according to a first embodiment of the present invention.
Figure 3:
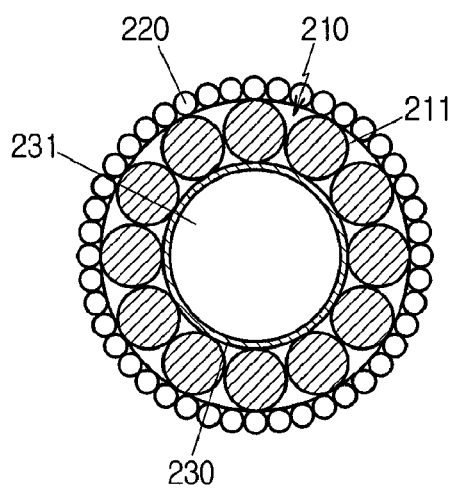
FIG. 3 is a sectional view of the construction of a former according to a second embodiment of the present invention.

FIG. 1 is a sectional view of the construction of a superconductive cable according to the present invention, FIG. 2 is a sectional view of the construction of a former according to a first embodiment of the present invention, and FIG. 3 is a sectional view of the construction of a former according to a second embodiment of the present invention.

As shown in FIG. 1, the superconductive cable 100 according to the invention generally includes a core 110 having a superconductive layer 111, and a cryostat 120 surrounding the core to keep it in a cryogenic state.

In specific, the cryostat 120 has an inner metal sheath 121 and an outer metal sheath 123, an inter-space therebetween being preferably kept in a vacuum state so as to cut off convection heat and conduction heat. In addition, between the inner and outer metal sheaths 121 and 123, a heat-insulation tape 122 of a multilayered aluminum tape is provided so as to cut off radiant heat from outside.

Meanwhile, in an inner space defined by the cryostat 120, the plurality of cores 110 is provided, which has the superconductive layer where superconductivity occurs. A structure of the core 110 is as follows.

The core 110 may have for example a circular sectional shape, the center of which a former 200 is positioned, on which the superconductive layer 111, an insulating layer 112, and a superconductivity-shielding layer 113 are laminated in order.

The former 200 can be embodied in various structures according to the embodiments of the present invention. According to a first embodiment, as shown in FIG. 2, the former 200 may consist of a wire-wound part 210 around which a plurality of wires 211 is wound, and an eddy-current prevention layer 220. The wire-wound part 210 has a structure that the plurality of wires 211 is wound thereon, so that AC loss is reduced, and temperature elevation due to eddy-current is prevented.

The eddy-current prevention layer 220 serves to secondarily restrict the eddy-current in addition to the primary restriction by the wire-wound part 210. Generally, in the superconductive cable having the former and the superconductive layer 111 outside the former, a magnetic field is generated in an axial direction of the core 110 by the current flowing through the superconductive layer so that an eddy current is generated due to the magnetic field. Such an eddy-current prevention layer 220 employed in the former structure of the present invention finally restricts the generation of the eddy current. To increase the reduction efficiency in AC loss and eddy current of the superconductive cable, the metal wires 211 of the wire-wound part and the eddy-current prevention layer 20 should be made of relatively higher electric resistance than a metal wire, so that the present invention proposes a copper alloy, e.g., Cu—Zn alloy.

Meanwhile, the former 200 structure according to the second embodiment of the present invention includes a cooling passage 231 at its center portion as shown in FIG. 3. The cooling passage 231 may be defined by a metal tube 230 of a stainless steel. Through the cooling passage 231, a cooling medium such as liquid nitrogen flows to keep the superconductive cable in a cryogenic state. The diameter of the cooling passage 231 can be diversely changed for example to the extent from 10 to 30 mm. On the metal tube 230 defining the cooling passage 231, the wire-wound part 210 having metal wires 211 wound and the eddy-current prevention layer 220 are laminated in order. Like in the first embodiment, the wire-wound part 210 and the eddy-current prevention layer 220 serve to restrict the generation of the AC loss and the eddy-current, and are made of a copper alloy, such as Cu—Zn alloy. In the second embodiment, the metal wires 211 provided between the eddy-current prevention layer 220 and the metal layer may not be provided like windings.

The former 200 structure of the superconductive cable is constructed to have the wire-wound part 210 and the eddy-current prevention layer 220 and to render the metal wires 211 of the wire-wound part 210 and the eddy-current prevention layer 220 composed of high electric resistance material, such as Cu—Zn alloy, so that upon superconductive current flowing, it is prevented the current from flowing to the former 200 to the maximum extent. In addition, according to an embodiment, the cooling passage 231 is provided at the center of the former 200 and the cooling medium flows there through, so that the former 200 is restricted to increase in its temperature. Although preferred embodiments of the present invention have been described for illustrative purposes, those skilled in the art will appreciate that various modifications, additions and substitutions are possible, without departing from the scope and spirit of the invention as disclosed in the accompanying claims.

INDUSTRIAL APPLICABILITY

As set forth before, according to the superconductive cable of the present invention, the former of the superconductive cable is constructed to be basically composed of high electric resistance material and to have the eddy-current prevention layer, the cooling passage and the like, thereby restricting the generation of the eddy-current in the former and therefore minimizing the AC loss of the superconductive cable to the maximum extent.

The invention claimed is:

1. A superconductive cable including a former surrounded by a superconductive layer and a cryostat provided at the outside of the superconductive layer, wherein the former includes a metal wire-wound part around which a plurality of wires is wound and an eddy-current prevention layer provided on the outer face of the wire-wound part, and the metal wires and the eddy-current prevention layer are made of a copper alloy.

2. The superconductive cable as claimed in claim 1, wherein the copper alloy is a Cu—Zn alloy.

3. The superconductive cable as claimed in claim 1, wherein a metal tube is provided along the center of the wire-wound part, and through which tube a cooling medium flows.

4. The superconductive cable as claimed in claim 3, wherein the metal tube has a diameter ranging from 10 to 30 mm.

* * * * *